Nov. 18, 1941.   G. E. JOHNSON   2,263,173
ROLL CUTTER
Filed May 19, 1941   2 Sheets-Sheet 1

INVENTOR
GUY E. JOHNSON
BY
Sheffield &
HIS ATTORNEYS

Nov. 18, 1941.   G. E. JOHNSON   2,263,173
ROLL CUTTER
Filed May 19, 1941   2 Sheets-Sheet 2
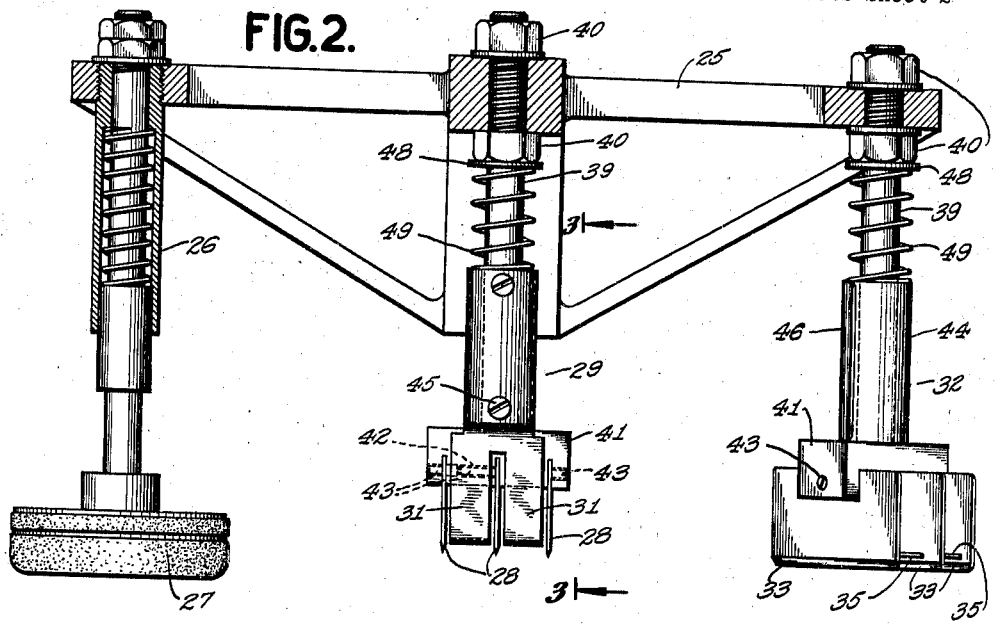
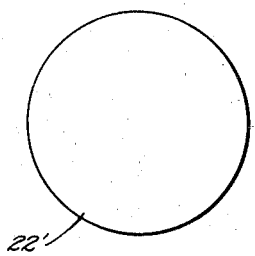
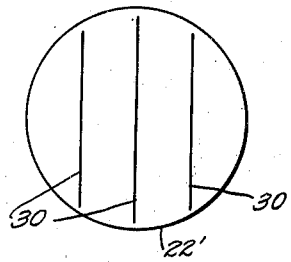
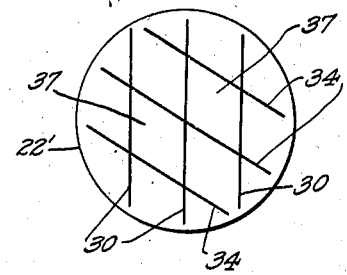
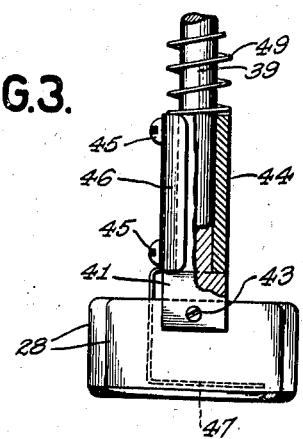
INVENTOR
GUY E. JOHNSON
BY  Sheffield & Betts
HIS ATTORNEYS Patented Nov. 18, 1941

2,263,173

UNITED STATES PATENT OFFICE 2,263,173

ROLL CUTTER

Guy E. Johnson, Yonkers, N. Y., assignor to Duvernoy & Sons, Inc., New York, N. Y., a corporation of New York Application May 19, 1941, Serial No. 394,124

4 Claims. (Cl. 107—8)

My invention constitutes improvements in machines known as roll-cutters which are used to cut desired designs in discs of dough (which are subsequently to be baked into rolls). My invention is particularly applicable where the design embodies lines that cross each other in such a way that areas on the surface of the dough are completely enclosed by such lines.

The primary object and advantage of my invention are to make it possible to cut the desired designs without creating difficulties which interfere with the automatic operation of the machine. Other advantages will be apparent to those skilled in the art from the following specification.

In the drawings—

Fig. 2 is a side elevation of the bracket and of the knife assemblies, etc., carried thereby, parts thereof being shown in section;

Fig. 3 is a detail (looking in the direction of the arrows 3, 3 of Fig. 2) of a portion of one of my knife assemblies, parts thereof also being shown in section; and Figs. 4, 5, and 6 are plan views of the disc of dough at various stages in the cutting operation.

Figure 1:
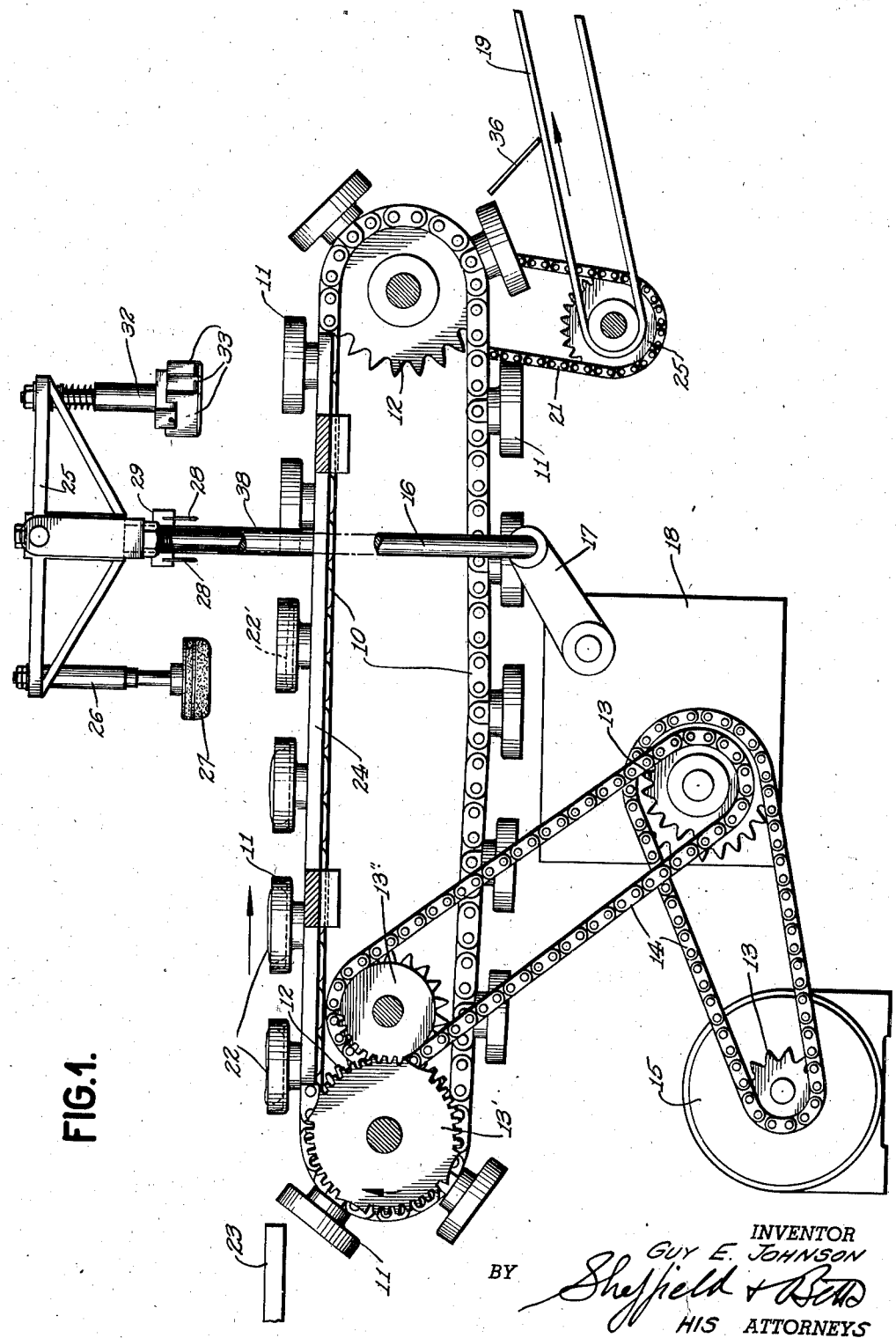
Figure 1 is a side elevation of a roll-cutting machine embodying a preferred form of my invention, the representation of the machine being partly diagrammatic.

Referring to the drawings, the roll-cutting machine is shown largely in diagrammatic form in view of the fact that the conveyor and associated parts of the apparatus are already known in the art. One type of machine to which my invention has been applied comprises an endless chain 10, which carries a series of dough cups 11 which are equally spaced along the chain. The chain is carried by suitable sprocket wheels 12, the left-hand one of which is intermittently rotated through the gears and sprocket wheels 13 and associated driving chains 14—the source of power being the electric motor or other suitable device 15. The intermittent motion may be secured by the arrangement of the teeth on wheels 13' and 13" which is shown in drawings, or by any other suitable means. The machine is also provided with a reciprocating shaft 16, operated by the arm 17 which is given a swinging motion by any suitable means (not shown) within the casing 18, which means are associated with the motor 15. The shaft 16 transmits the reciprocating motion to a bracket 25 which carries a stamping member and, in accordance with my invention, a plurality of knife assemblies which will be described in greater detail hereinafter.

The intermittent motion of the conveyor is so timed with respect to the motion of the lever 17 and shaft 16 that the conveyor is stationary during the time that the lowest parts of the stamping member and knife assemblies enter and leave the dough cups.

A supplementary conveyor 19 may be provided, operated by the chain 21 and sprocket wheel 20, the purpose of which is to carry away from the roll-cutting machine the discs of dough after they have been submitted to the cutting operation.

The dough which is eventually to be baked into rolls is first mixed and then proofed or otherwise treated so that it becomes comparatively stiff. Slabs or pats of the dough are then roughly molded and one of them is placed in each of the dough cups 11 (as indicated at 22) when each dough cup passes the end of the platform 23. The dough cups, in which the slabs 22 of dough have been inserted, then move along the machine in the direction indicated by the arrow above one of the dough cups in Fig. 1, the upper part of the conveyor being properly supported by the frame 24 or other suitable structure.

Following the passage of a slab of dough through a machine embodying my invention, it is first carried along the conveyor until it is immediately below the stamping or flattening member 26. The cup containing the slab of dough stops beneath the flattening member and the shaft 16 then moves downwardly so that the pad 27 of the flattening member comes into contact with the slab and flattens it out so that the slab takes the form, within the dough cup, of a thin circular disc 22' of dough—i. e., the form indicated in Fig. 4. The shaft 16, together with the bracket 25 and the flattening member 26, then rise and the conveyor again moves forward a distance equal to the distance between the centers of the dough cups. This brings the particular dough cup under consideration to a position beneath the first knife assembly 29. The conveyor then again stops and the shaft 16 again moves downwardly. In this cycle of the operation, the knives 28 of the knife assembly 29 cut into the disc of dough, leaving therein the slits or cuts 30, shown in Fig. 5. When the knife assembly rises, the disc of dough is ejected therefrom (by means of the ejector 31, which will subsequently be described) so that it remains in or falls back into the dough cup. This cycle of the operation having been completed, the conveyor again moves forward the same distance and again stops. As each of the three elements (the flattening element and the two knife assemblies) on the bracket 25 is spaced from the adjacent element by a distance equal to that between the centers of the dough cups and as the conveyor moves the same distance between each stop, the last-mentioned motion of the conveyor will bring the particular dough cup under consideration to a position beneath the second knife assembly 32. While the conveyor is thus again stationary, the shaft 16 again moves downwardly so that the knives 33 carried by the knife assembly 32 cut into the disc of dough, leaving therein the second set of slits or cuts 34 (see Fig. 6). As in the case of the knife assembly 29, the knife assembly 32 is also provided with an ejector 35 which causes the disc of dough to remain in or fall back into its dough cup when the knife assembly is raised. After the slits 34 have been cut in the dough, the conveyor continues its intermittent forward motion until the disc of dough 36, bearing the desired design cut therein, is dropped onto the supplementary conveyor 19 to be carried to a place suitable for subsequent treatment.

It will of course be understood that, in normal use of the machine, slabs of dough are placed in each dough cup as it passes the platform 23 and each slab of dough is successively subjected first to the stamping or flattening operation and thereafter to cutting by each of the knife assemblies.

Attempts have heretofore been made to cut into the discs of dough designs such as the one shown in Fig. 6 by the use of a single knife assembly provided with cutting edges embodying the entire design. This arrangement, however, was found to be impractical—in fact, substantially inoperative. The difficulties were particularly aggravated by the presence, in the design, of areas—such as those indicated in Fig. 6 by the numeral 37—which were entirely enclosed by the cuts. Such areas meant that there were cup-like spaces between the cutting edges of the knife assembly, which spaces were enclosed on all sides except adjacent the cutting edges. These cup-like spaces had the objectionable effects, first, of squashing the dough down in such areas (due to the pressure of the air in the cup-like spaces) and second, of causing the discs of dough to be lifted (due to suction effect) out of the dough cups. The former effect resulted in ineffective cutting of the discs and in undesired flattened areas therein; the latter resulted either in its being necessary to strip the discs from the knives and replace them by hand in the cups or in their dropping off the knives and falling back into the cups in improper position or dropping outside of the cups. The objectionable results of these defective operations are obvious.

I have found that the arrangement shown in the drawings and herein described overcomes these objections and results in smooth, satisfactory, and entirely automatic operation of the roll-cutting machine and permits the machine to be speeded up beyond the usual rate.

I will now describe in greater detail my preferred form of knife assembly,—such as shown at 29 and 32. Each of these assemblies is carried by the bracket 25 which, as already stated, is operated by the shaft 16 and the motion of which is guided by the shaft or tube 38 or other suitable means associated with the frame 24. The knife assembly comprises a rod 39 which is threaded at its upper end and passes through an aperture in the bracket 25, the rod being held in desired position by nuts 40. Rigidly affixed to the lower end of the rod 39 is a block 41 which, for the particular design shown in Fig. 6, is provided, on its under side, with three parallel slots and which is also drilled as indicated at 42, the hole 42 being internally threaded. Mounted in each of the slots is one of the knife blades 28 or 33, which blades are held in position by set screws 43. The knife assembly is also provided with a sleeve 44 which is mounted on the rod 39 with sufficient clearance to permit the sleeve freely to slide up and down on the rod. Affixed to the sleeve 44 (by machine screws 45 or otherwise) is a curved plate 46, the lower portion of which is flattened out and slotted and extends downwardly and then horizontally between the knife blades. Preferably, the horizontal surfaces 47 of this member are located adjacent to and between the cutting edges of the knives. The purpose of this member is, as already explained, to eject the disc of dough in case it adheres to the knives when the knife assembly rises after the disc has been cut. Bearing against the upper surface of the sleeve 44 and also against a washer 48 which is carried by the rod below the lower nut 40 is a coil spring 49. The spring is weak enough to permit the ejector, 31 or 35, to be raised by the dough when the knives enter the latter and, on the other hand, is strong enough to eject the disc of dough from the knives immediately the latter commence to rise from their lowest position.

As will be understood, in order to cut the dough with the design shown in Fig. 6, the parallel knives of one of the knife assemblies are so positioned with respect to those of the other assembly as to make the desired angle therewith.

Description of further details, either of the machine or of the operation or adjustment of parts thereof, etc., appears unnecessary since such matters are either well known or will readily be understood by those skilled in the art. Such details include the mechanism for securing suitable timing of the intermittent motion of the conveyor with respect to the reciprocating motion of the shaft 16; the materials of which various parts are to be constructed; the shape of the dough cups; the construction of the flattening member; the adjustment of the lowest points of motion of the flattening member and of the knives; prior and subsequent treatment of the dough; speed of operation of the machine; etc.

It will be evident to those skilled in the art that many modifications may be made in the construction and arrangement of the various parts of my roll-cutter—the form shown herein being merely the preferred form when the design shown in Fig. 6 is to be cut in the dough that is eventually to be baked into a roll. I therefore do not wish to be limited to the arrangement or details shown and described herein but wish to secure protection for all such variations therein or modifications thereof as may come within the scope of the appended claims.

Having described my invention, I claim:

1. In a roll-cutter comprising a series of dough cups carried by a conveyor, equally spaced thereon, and traveling along a line, the combination comprising a plurality of knife assemblies, said assemblies being spaced apart a distance equal to that separating the centers of the dough cups and being in the vertical plane determined by the series of dough cups; means for momentarily and simultaneously depressing and raising the knife assemblies whereby dough carried by a plurality of cups is simultaneously cut; means associated with each knife assembly for ejecting the dough from the knives as the latter rise from the cups; and means for moving the conveyor, while the knives are out of contact with the dough, a distance equal to that between two adjacent knife assemblies.

2. In apparatus for cutting designs in discs of dough the combination comprising a pair of knife assemblies, each provided with a plurality of parallel cutting-knives, the knives of each assembly being at an angle with those of the other assembly, and means for causing each knife assembly to operate successively on the same disc of dough.

3. A knife assembly for a roll-cutter comprising in combination a rod; a plurality of spaced, vertical cutting-knives rigidly carried thereby; a sleeve surrounding a portion of the rod and axially movable thereon; a member extending from the sleeve into the space between each adjacent pair of cutting-knives and having a horizontal portion normally positioned adjacent the cutting edges of the knives; and means tending to cause said horizontal portion of said member, when the same is displaced from its normal position adjacent the cutting edges of the knives, to return to its normal position.

4. In a roll-cutter comprising a series of dough cups carried by a conveyor; equally spaced thereon, and traveling along a line, the combination comprising a pair of knife assemblies, said assemblies being spaced apart a distance equal to that separating the centers of the dough cups and being in the vertical plane determined by the series of dough cups; each of said assemblies being provided with a plurality of parallel cutting-knives, the knives of each assembly being at an angle with those of the other assembly; means for momentarily and simultaneously depressing and raising the knife assemblies whereby dough carried by a plurality of cups is simultaneously cut; and means for moving the conveyor, while the knives are out of contact with the dough, a distance equal to that between two adjacent knife assemblies whereby the dough in each cup is successively cut by the knives of each assembly.

GUY E. JOHNSON.